July 16, 1935. E. F. PULS 2,008,226
CONTROL MECHANISM PARTICULARLY FOR CONTROLLING
PRESELECTIVE CHANGE SPEED GEARING
Filed March 7, 1934 3 Sheets-Sheet 1

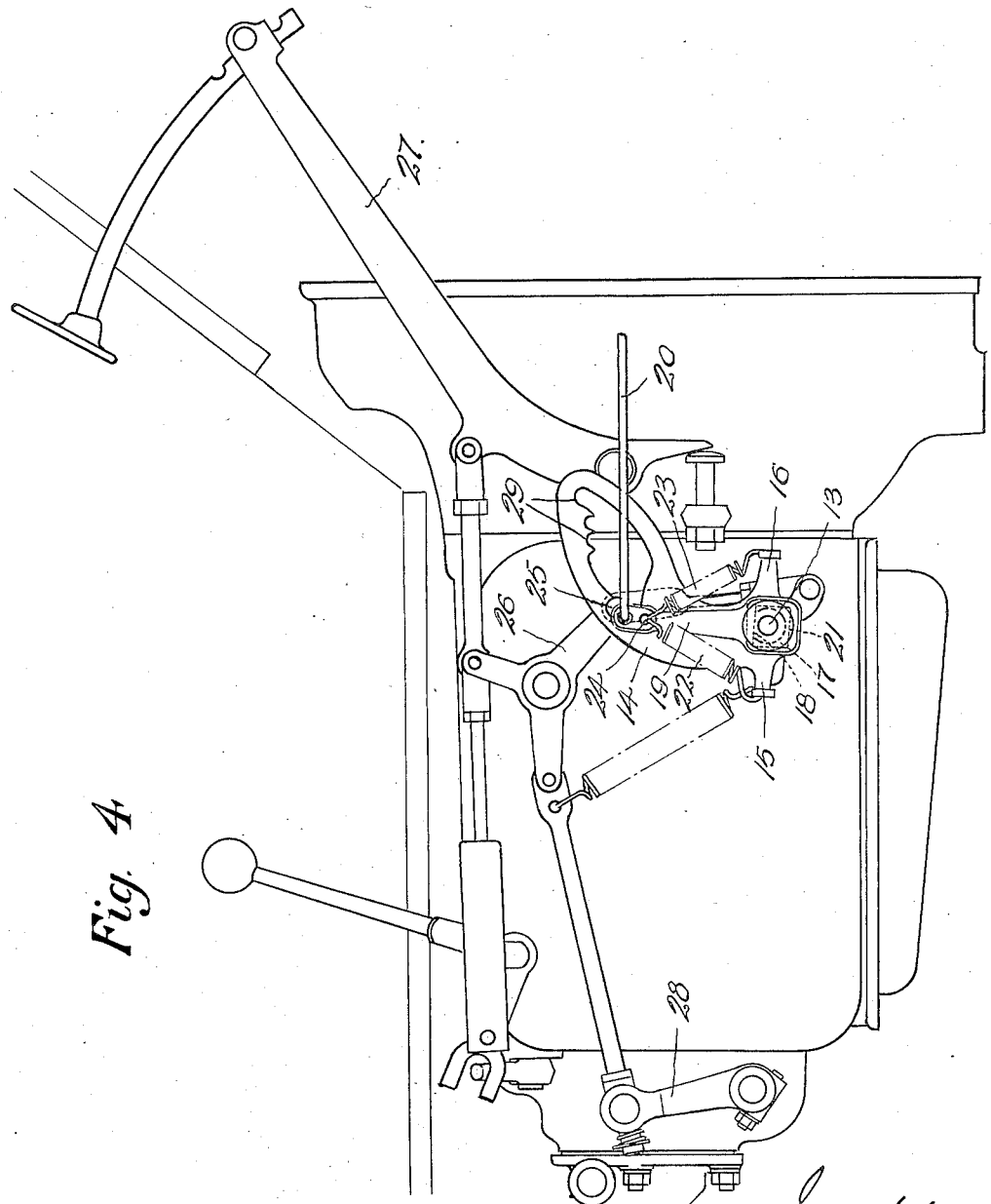

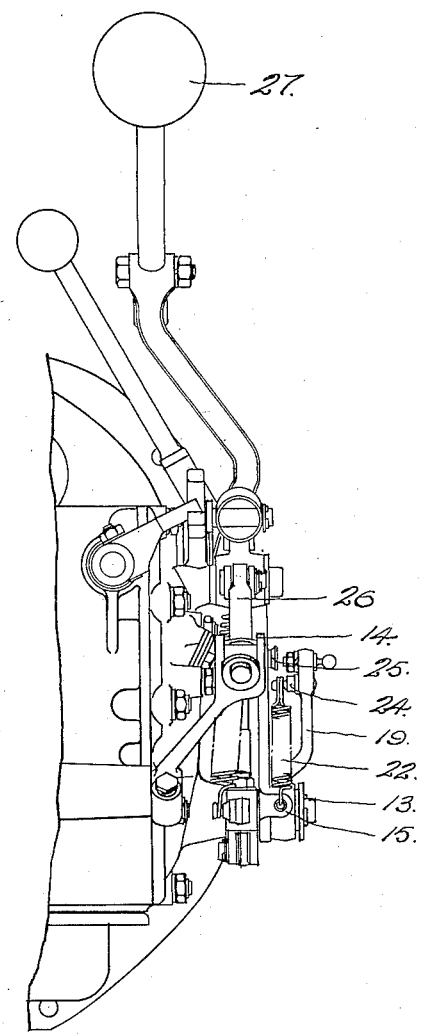

Patented July 16, 1935

2,008,226

UNITED STATES PATENT OFFICE 2,008,226

CONTROL MECHANISM PARTICULARLY FOR CONTROLLING PRESELECTIVE CHANGE-SPEED GEARING

Erich Friedrich Puls, King's Norton, Birmingham, England

Application March 7, 1934, Serial No. 714,520
In Great Britain March 11, 1933

5 Claims. (Cl. 74—334)

This invention relates to a new or improved control mechanism particularly for controlling preselective change-speed gearing of the type in which a particular gear is selected by movement of a lever or the like and is subsequently engaged by movement of a pedal or the like.

The object of my invention is to provide an improved control mechanism which is positive in action, provides a definite stop for the pedal or the like in a position corresponding to each gear, and is capable of use with gearing of the type described in the specification of U. S. Patent No. 1,647,580 in which the engagement of any gear is determined by the inertia of the driven parts, my improved control being so arranged that a change of gear is only effected if conditions are appropriate.

According to my invention a control member capable of rocking about a shaft is connected by balanced springs to opposed arms on a lever mounted on the same shaft and the springs normally hold the control member in such a position relative to the lever that flats or equivalent surfaces on the two parts are in engagement. Any angular movement of the control member about the shaft increases the tension of one spring and reduces that of the other and at the same time moves the flats or equivalent surfaces out of engagement so that the lever is now under a force urging it to follow up the control member and it will do so as soon as it is permitted.

Various forms of mechanism are known in which movement of one member tensions a spring connected to a second member retained by a detent or other releasable means but such mechanisms have either been too sensitive or have introduced a considerable amount of frictional resistance. My improved control mechanism can be practically frictionless and the operation of the device is not dependent on any particular strength of the springs which can be made of any desired strength according to requirements.

A preferred embodiment of my invention as applied to the control of a preselective gear-box is illustrated by way of example in the accompanying drawings in which:—

Figure 4 is a side elevation of a gear-box embodying my improved control.

Figure 5 is an end elevation of the control mechanism for the gear-box.

Figure 1:
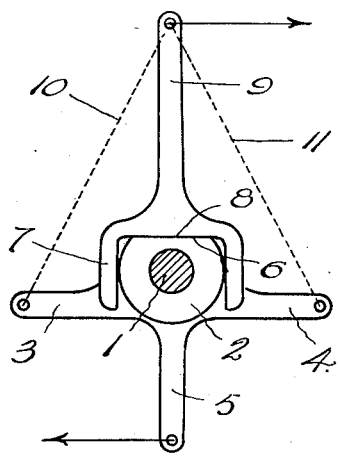
Figure 1 is a diagrammatic outline of the control in the normal position.
Figure 2:
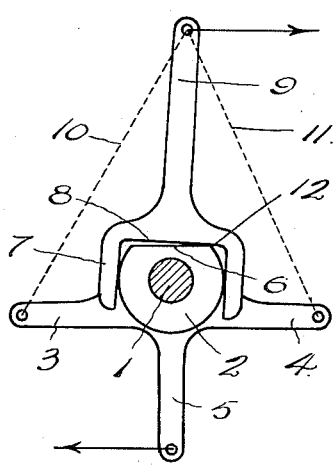
Figure 2 is a similar view showing one member of the control moved through a very small angle.
Figure 3:
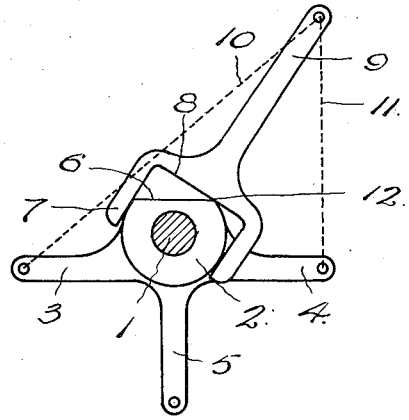
Figure 3 is a similar view showing one member of the control moved into one extreme position.

In Figures 1, 2 and 3, 1 is a spindle on which is mounted a boss 2. The spindle may be fixed in which case the boss is rotatable on it or it may be rotatable in which case the boss may be keyed on the spindle.

Integral with the boss are opposed radially projecting arms 3, 4, and a lever 5 adapted to be connected by a link or other member to a part to be moved, as for example a gear-controlling camshaft in a preselective gear-box. A flat 6 is formed on the upper side of the boss with its surface parallel to the axes of the arms 3, 4. Fitting over the boss is a fork 7 having a flat face 8 adapted to engage the flat 6, and projecting upwardly from the fork is a control lever 9 adapted to be connected to a movable member such as a preselector lever. Tension springs of equal strength indicated by the dotted lines 10, 11 connect the extremities of the arms 3, 4 respectively to a point on the control lever 9. Normally the parts are in the position shown in Figure 1 with the flats 6 and 8 in alignment, and the lever 9 midway between the arms 3, 4 so that the springs are equally tensioned.

Now, if the lever 9 is rocked over through a very small angle as shown in Figure 2 the tension of the spring 10 is increased slightly and that of the spring 11 is decreased slightly. At the same time the flat surfaces 6 and 8 are thrown out of alignment and the point of contact between the fork and the boss is shifted to the point 12. This point is at a substantial distance from the line of action of the spring 10 and at a much shorter distance from that of the spring 11 so that the slight increase in the tension of the spring 10 causes a considerable moment to be exerted on the boss 2 tending to rotate the boss in the direction in which the control lever 9 has been moved until the flat surfaces 6 and 8 are again in alignment, and this following up movement of the boss will cause a movement of the lever 5 of the same amplitude as that of the lever 9 as soon as the lever 5 is permitted to move by the part or parts with which it is connected.

If the lever 9 is rocked through a substantial angle as shown in Figure 3 the tension of the spring 10 is considerably increased while that of the spring 11 is correspondingly reduced.

At the same time the line of action of the spring 10 is brought much closer to the point of contact 12 between the fork and the boss and the line of action of the spring 11 is moved further from that point. Thus by suitably proportioning the various parts the turning moment exerted on the boss 2 can be kept substantially constant for any angular movement of the lever 9.

This feature is of particular advantage where the control is applied to a preselective gear-box.

One application of my improved control to a preselective gear-box of the type described in U. S. Patent No. 1,647,580 is illustrated in Figures 4 and 5. In these drawings 13 is a rotatable shaft on which is keyed a lever 14 having opposed arms 15, 16. The lever also has a boss 17 on which is a flat 18 parallel to the axes of the arms. An arm 19 connected at its free end to a link 20 leading to a preselector lever has at its lower end a square opening 21 fitting freely over the boss 17 and the upper side of the opening is held in contact with the flat 18 on the boss by tension springs 22, 23, connected between the ends of the arms 15, 16 and an anchorage 24 on the arm 19. Angular movement of the arm 19 from the preselector lever tensions one of the springs 22 or 23 and throws the upper side of the opening out of alignment with the flat 18 so that a turning moment is applied to the boss 17 and therefore to the shaft 13, and the shaft 13 is geared to a camshaft in the gearbox which is rotated immediately the torque conditions in the gearbox permit.

In the construction illustrated the follow-up movement of the lever 14 is controlled by a peg 25 on one arm 26 of a three-armed lever of which the other arms are respectively coupled to a pedal 27 and a clutch-operating lever 28. After the arm 19 has been moved by the preselector lever no movement of the lever 14 can take place until the pedal 27 is depressed to disengage the peg 25 from one of a series of notches 29 in an opening in the lever. The lever 14 then follows up the lever 19 provided torque conditions in the gear-box permit the camshaft to rotate, and the peg engages another notch in the lever and positively locates the pedal in the new position. The pedal with the arrangement shown in the drawings can be depressed at any time to disengage the clutch without necessarily effecting a change of gear.

The notches 29 are preferably made of such a form that a particular notch will be engaged by the peg within a substantial range in the movement of the lever 13. This is very important when the preselector lever is mounted on the body of a vehicle or on some other part which may move relatively to the gear-box, as it eliminates the necessity for fine adjustments of the control.

Change-speed mechanism of the type described in the specification of U. S. Patent No. 1,647,580 is normally automatic in action for a change of gear from a lower to a higher ratio, a movement of a camshaft to permit a change of gear taking place only under certain conditions of torque in the drive.

The preselector control mechanism described above when applied to such a gear provides an overriding mechanical control for the automatic gear-changing mechanism operated by the pedal so that the whole gearbox is made substantially foolproof. For example if the driver has moved the preselector lever into a low gear position and depresses the pedal when the car is travelling at a high speed the low gear cannot be engaged until the torque conditions in the drive permit it, and similarly if an attempt is made to start with the selector lever in top gear position only the lowest gear will be engaged, the successive gears being subsequently engaged when the torque conditions permit, and the pedal position will follow up the movement of the control arm only step by step.

I claim:

1. Control mechanism particularly for controlling preselective change-speed gearing comprising a control member and a controlled member relatively movable angularly about a common axis, co-operating flat surfaces on said members, and spring means connecting said members and normally holding said flat surfaces in aligned engagement, said flat surfaces and spring means in conjunction permitting the control member to move angularly step by step in either direction while the controlled member remains stationary and causing the controlled member to follow up the movement of the control member when the controlled member is free to move.

2. Control mechanism particularly for controlling preselective change-speed gearing comprising a control member capable of rocking about a shaft, a lever also capable of rocking about said shaft, opposed arms on said lever, balanced springs connecting said arms to said control member, and co-operating flat surfaces on said control member and said lever normally held in aligned engagement by said springs, angular movement of the control member about the shaft increasing the tension of one spring relative to the other and throwing said flat surfaces out of alignment to apply a turning moment to the lever which follows up the movement of the control member when permitted.

3. Control mechanism particularly for controlling preselective change-speed gearing comprising a control member capable of rocking about a shaft, a lever also capable of rocking about said shaft, opposed arms on said lever, a boss on said lever and a flat on said boss parallel to the axes of the opposed arms, a part on said control member fitting over said boss and having a flat surface co-operating with the flat on said boss, and balanced springs connecting the arms on the said lever to the control member, angular movement of the control member tensioning one spring and slackening the other and throwing the flat surface on the control member out of alignment with the flat on the boss to apply to the boss and lever a turning moment which is governed by the difference in the tension of the springs and by the displacement of the control member relative to the lever and is substantially constant for different angular movements of the control member.

4. Control mechanism particularly for controlling preselective change-speed gearing comprising a control member and a controlled member relatively movable angularly about a common axis, co-operating flat surfaces on said members, spring means connecting said members and normally holding said flat surfaces in aligned engagement, a gear-operating element coupled to said controlled member, and a gear-selecting element coupled to said control member, said gear-selecting element moving said control member angularly and applying through said spring means and co-operating flat surfaces a turning moment to said controlled member which follows up the movement of the control member and causes movement of the gear-operating element provided said element is free to move.

5. Control mechanism particularly for controlling preselective change-speed gearing comprising a control member and a controlled member relatively movable angularly about a common axis, co-operating flat surfaces on said members, spring means connecting said members and normally holding said flat surfaces in alignment, a gear-operating element coupled to said controlled member, and a gear-selecting element coupled to said control member, a series of notches on said controlled member, a pedal, and a peg coupled to and moving with said pedal and adapted to engage any one of said notches, said gear-selecting element moving said control member angularly and applying a turning moment to said controlled member which is held against movement until said pedal is depressed to disengage said peg from said notch.

ERICH FRIEDRICH PULS.